Aug. 23, 1966     H. F. GARRISON     3,267,982
TIRE REPAIR DEVICE
Filed Sept. 14, 1964
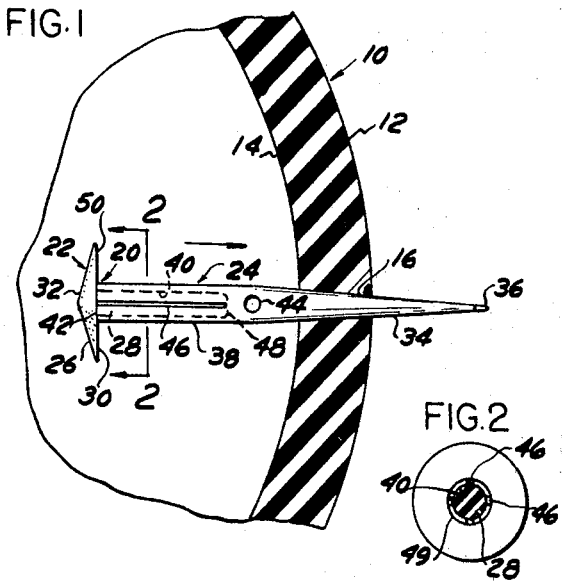
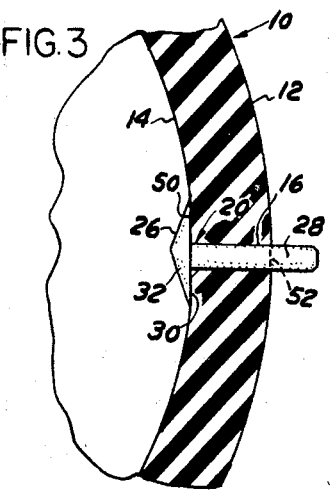
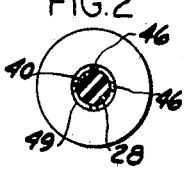
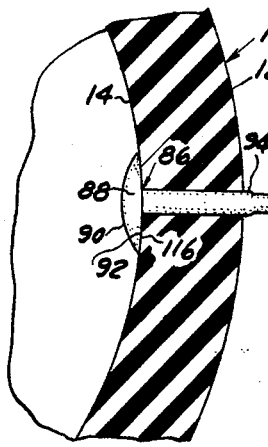
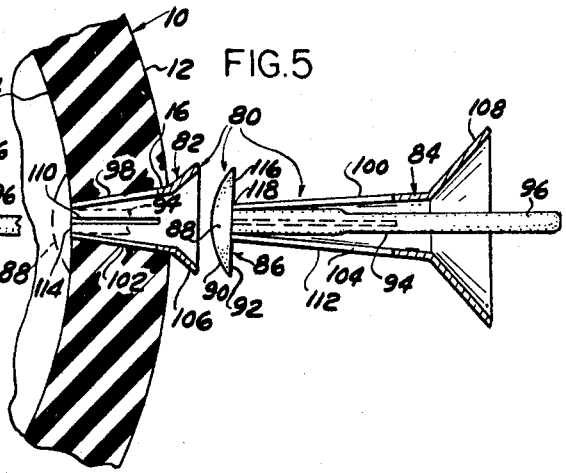
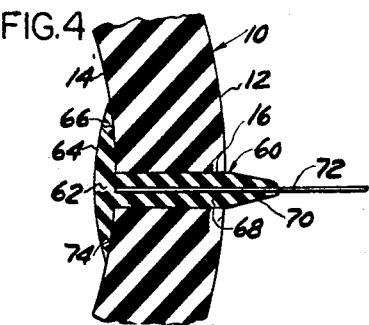
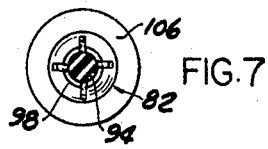
INVENTOR.
HARRY F. GARRISON
BY *Barthel & Bugbee*
ATTORNEYS United States Patent Office 3,267,982
Patented August 23, 1966

3,267,982
TIRE REPAIR DEVICE
Harry F. Garrison, 7470 Gerald, Warren, Mich.
Filed Sept. 14, 1964, Ser. No. 396,132
1 Claim. (Cl. 152—370)

This invention relates to pneumatic tries and, in particular, to means for repairing punctures in such tires.

One object of this invention is to provide means for repairing a tire puncture from inside the tire, wherein a pull member, such as a rod or wire provides a tire-penetrating member which is embedded in the shank or stem of the repair plug and is inserted through the puncture from the inside of the tire and used to pull the shank outward through the puncture until the head of the plug comes firmly into engagement with the inner surface of the tire and is adhesively held in place, whereupon the pull member is removed by means of a sharp jerk with a pair of pliers.

Another object is to provide a further modified means for repairing a tire from outside the tire, consisting of tire-penetrating means including an outer funnel which is pushed through the puncture from the outside and an inner funnel, the latter containing the elongated shank or stem of a puncture repair plug with the head thereof against the small diameter end of the funnel, the inner funnel being pushed through the outer funnel into the interior of the tire, the plug head deforming and compressing in order to pass through the passageway of the outer funnel, the slotted portions of which expand outward to assist in the passage of the plug head, whereupon the inner funnel is withdrawn, followed by the outer funnel, and the elongated projecting portion of the shank of the plug is cut off level with the outer surface of the tire.

Other objects and advantages of the invention will become apparent during the course of the following description of the accompanying drawing, wherein:

FIGURE 1 is a fragmentary horizontal section through a portion of a pneumatic tire at the start of the puncture repair operation from the inside of the tire by a tire repair means of the present invention, showing the plug insertion needle inserted partway through the tire;

FIGURE 2 is a cross section taken along the line 2—2 in FIGURE 1;

FIGURE 3 is a view similar to FIGURE 1, but showing the repair nearly completed with the plug insertion needle withdrawn and t he projecting portion of the repair plug shank ready to be cut off level with the outer surface of the tire;

FIGURE 4 is a fragmentary horizontal section through a portion of a pneumatic tire with a puncture thereof repaired from the inside of the tire by a modified puncture repair plug according to another form of the present invention;

FIGURE 5 is a fragmentary horizontal section through a portion of a pneumatic tire at the start of the puncture repair operation from the outside of the tire by a further modified tire repair means;

FIGURE 6 is a view similar to FIGURE 5, but showing the positions of certain of the parts near the end of the repair operation by the repair means of FIGURE 5; and FIGURE 7 is a cross-section taken along the line 7—7 in FIGURE 6.

Referring to the drawing in detail, FIGURES 1 and 3 show in fragmentary horizontal section a portion of a tire, generally designated 10, having outer and inner surfaces 12 and 14 and a puncture or hole 16 extending therethrough. The tire 10 of FIGURES 1, 2 and 3 is assumed to be accessible from the inside for repair purposes, and is shown at the start of repair operations by a tire repair device, generally and collectively designated 20, according to the present invention and including a puncture repair plug 22 and a plug insertion needle 24. The plug 22 is of elastic deformable or elastomeric material with an enlarged head 26 and an elongated shank or stem 28 projecting from the central portion thereof perpendicular to its rearward surface 30. The head 26 has a dome-shaped surface 32 opposite the surface 30.

The plug insertion needle 24 is in the form of an elongated rod having a forward tapered portion 34 with a pointed tip 36 and a rearward cylindrical portion 38 containing a cylindrical socket 40 of a diameter adapted to snugly receive the shank 28 of the plug 22 and having a depth sufficient to receive the entire shank 28 and enable the inner surface 30 of the plug 22 to abut the rearward end 42 of the needle 24. Adjacent the junction of the tapered and cylindrical portions 34 and 38, the needle 24 is provided with a transverse hole 44 for the insertion of a withdrawal pin or handle (not shown), as described below in connection with the operation of the invention. The needle 24 is preferably made from spring steel and has a plurality of elongated longitudinal slots 46 (FIGURE 2) extending through the wall of the rearward portion 38 into the socket 40 thereof. The slots 46 extend the entire length of the socket from the bottom 48 thereof to the rearward end 42 of the needle 24, and serve as resilient jaws 49 snugly gripping the plug shank 28.

In the use of the tire repair device 20, a suitable puncture repair plug 22 is selected, the inner surface 30 of its head 26 is coated with a layer 50 of a suitable conventional adhesive, such as rubber cement, and its shank 28 is pushed into the socket 40 of a plug-insertion needle 24 according to the present invention. The head 26 of the plug 22 is then pushed toward the needle 24 until the inner surface 30 of the head 26 engages the rearward end 42 of the needle 24. After roughening the area of the inner surface 14 around the puncture 16, the operator then inserts the pointed tip 36 of the needle 24 in the rearward or inner end of the puncture 16 and by applying pressure upon the head 26 of the plug 22 pushes the tapered forward portion 34 and cylindrical rearward portion 38 through the puncture 16 until the inner surface 30 of plug head 26 engages the inner surface 14 of the tire 10. By now, the major portion of the needle 24 projects outwaard beyond the outer surface 12 of the tire, including the tapered forward portion 34 and the transverse hole 44. The operator now inserts the suitable tool into the hole 44, such as a steel pin or the opposite inwardly-projecting tips or jaws of a pair of pliers, and pulls outward so as to entirely withdraw the needle 24 from the puncture 16, leaving the plug 20 in position with its head 26 deformed slightly so that its cement-coated inner surface 30 snugly fits the inner surface 14 of the tire 10 (FIGURE 3), and the adhesive layer 50 firmly unites the two. By means of a knife, the operator then cuts off the outwardly-projecting portion of the shank 28 along the dotted line 52 (FIGURE 3) level with the outer surface 12 of the tire 10, the dotted line 52 then representing the exposed outer end of the shank 28.

The modified tire repair device, generally designated 60, shown in FIGURE 4 is applied to a puncture 16 in a tire 10 from inside the tire, as before, but the plug insertion needle 24 is eliminated. Instead, the device 60 itself constitutes a plug of elastomeric material, such as closed-cell sponge rubber, having a head 62 with outer and inner surfaces 64 and 66 and a shank or stem 68 with a tapered forward end or nose portion 70. Seated in the shank or stem 68 is a fairly stiff pull member 72, such as a wire, in such a manner that it will hold fast to the shank 68 under tension of ordinary pulls but will separate from it in response to a quick and powerful jerk or yank. Thus, the vulcanization, bonding or other means of releasably securing the pull member 70 must be capable of relinquishing its grip upon the application of excessive force.

In the operation of the tire repair device 60, the operator as before roughens the area of the inner surface 14 around the puncture 16, applies a layer 74 of suitable adhesive such as rubber cement to the normally flat inner surface 66 of the head 62, and then pushes the forward end of the wire or other pull member 72 needle-like through the puncture 16. He then pulls upon the projecting end of the wire or other pull member 72 such as by use of a pair of pliers, so as to force the tapered or nose portion 70 of the shank or stem 68 to pass into and through the puncture 16 until the cement-coated inner surface 66 of the head 62 engages the inner surface 14 of the tire 10 and deforms into mating engagement therewith. At the same time, the adhesive coating or layer 74 forms an adhesively-secured connection between the head 62 of the plug or tire repair device 60 and the inner surface 14 of the tire 10. A quick and forceful yank upon the wire 72 then dislodges the latter from the shank or stem 68 and the operator pulls the wire 72 completely out of the stem 68. The operator then cuts off the shank or stem 68 level with the outer surface 12 of the tire 10 and the repair job is thus completed.

The further modified tire repair device, generally designated 80, shown in FIGURES 5, 6 and 7, consists generally of an outer funnel 82, an inner funnel 84 and a repair plug 86 carried by the inner funnel 84. The repair plug 86 again is of elastic deformable material, such as either solid or closed-cell sponge rubber having an enlarged head 88 with outer and inner surfaces 90 and 92 respectively and an elongated shank or stem 94 terminating in a reduced diameter portion 96. The outer and inner funnels 82 and 84 are provided with elongated nesting frusto-conical nose portions or nozzles 98 and 100 respectively provided with elongated longitudinal slots 102 and 104 terminating at their rearward ends in flared frusto-conical flanges 106 and 108 (FIGURE 5). As before, the slots 102 and 104 divide the nose or nozzle portion 98 and 100 into jaws 110 and 112 respectively.

In the operation of the tire repair device 80, which takes place from outside the tire 10, the forward end 114 of the outer funnel 82 is inserted in the outer end of the puncture 16 and pushed inward, expanding the puncture 16 into frusto-conical form as it proceeds inward (FIGURE 5). Having coated the inner surface 92 of the head 88 with a layer 116 of cement, the operator inserts the forward end portion 96 of the stem or shank 94 into the forward end 118 of the inner funnel 84 and pushes upon the head 88 until its inner surface 92 comes to rest against the forward end 118. The operator then inserts the head 88 in the flared portion or flange 108 of the inner funnel 84, causing the head 88 of the repair plug 86 to enter and be forced through the interior of the tapered nose portion 98 of the outer funnel 82, deforming and compressing as this occurs, at the same time forcing the jaws 110 of the outer funnel 82 slightly outward.

As a result, the head 88 of the plug 86 is forced through the inner or smaller diameter end 114 of the nose portion 98 of the outer funnel 82 while the inner funnel 108 becomes nested or telescoped with the outer funnel 82. This action causes the head 88 to expand suddenly as it passes the outer funnel end 114 into the dotted line position shown in FIGURE 5. The operator then withdraws the inner funnel 84 by pulling upon the flange 108 thereof, at the same time pulling upon the end portion 96 of the repair plug 86 to seat the inner surface 92 of the head 88 firmly against the inner surface 14 of the tire 10 while deforming the head 88.

The adhesive layer 116 engages the inner surface 14 of the tire 10 and forms a secure joint between the plug 86 and the tire 10. The operator now pulls outward upon the flared flange 106 of the outer funnel 82 to withdraw the latter along the shank 94 in the manner shown in FIGURE 6. He then preferably applies an additional pull to the shank 94 to insure that the head 88 of the tire repair plug 86 is firmly seated against the tire 10 after which he cuts off the shank 94 level with the outer surface 12 of the tire 10.

What I claim is:

A tire puncture repair device, comprising
a repair plug of elastomeric material having an elongated shank and an enlarged head at one end of said shank,
and tire-penetrating means engageable with said shank and insertable in the puncture for guiding said shank through the puncture while pulling said head into mating engagement with the tire,
said tire-penetrating means comprising a stiff substantially headless pull wire embedded in said shank substantially the entire length of said shank with the embedded inner end of said pull wire disposed near said head and with the outer end of said pull wire projecting outwardly from the outer end of said shank remote from said head,
said wire being releasably secured to said shank and separable therefrom in response to a pulling force exceeding the force required to draw said shank through the tire by way of the puncture.

References Cited by the Examiner

UNITED STATES PATENTS

| | | | |
|---|---|---|---|
| 734,108 | 7/1903 | Tingley | 152—370 |
| 1,653,499 | 12/1927 | Fisher | 152—370 X |
| 2,230,660 | 2/1941 | Wedler | 152—370 |
| 2,974,715 | 3/1961 | Soares et al. | 152—370 X |

ARTHUR L. LA POINT, *Primary Examiner.*

C. W. HAEFELE, *Assistant Examiner.*